US012779876B2

(12) United States Patent
Matsukubo et al.

(10) Patent No.: US 12,779,876 B2
(45) Date of Patent: Nov. 3, 2026

(54) THERMAL HEAD AND THERMAL PRINTER

(71) Applicant: KYOCERA CORPORATION, Kyoto (JP)

(72) Inventors: Naoto Matsukubo, Kirishima (JP); Hidetaka Sonobata, Kirishima (JP); Taiki Asayama, Kirishima (JP); Tadayasu Komura, Tokyo (JP); Kenji Nakai, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 133 days.

(21) Appl. No.: 18/722,591

(22) PCT Filed: Dec. 1, 2022

(86) PCT No.: PCT/JP2022/044409
§ 371 (c)(1),
(2) Date: Jun. 21, 2024

(87) PCT Pub. No.: WO2023/120093
PCT Pub. Date: Jun. 29, 2023

(65) Prior Publication Data

US 2025/0058567 A1 Feb. 20, 2025

(30) Foreign Application Priority Data

Dec. 24, 2021 (JP) ................................ 2021-211727

(51) Int. Cl.
*B41J 2/335* (2006.01)
*B41J 11/04* (2006.01)

(52) U.S. Cl.
CPC .......... *B41J 2/33545* (2013.01); *B41J 11/04* (2013.01)

(58) Field of Classification Search
CPC . B41J 15/048; B41J 15/18; B41J 17/02; B41J 2/33515; B41J 2/33595; B41J 2/345
See application file for complete search history.

(56) References Cited

U.S. PATENT DOCUMENTS

2017/0320334 A1* 11/2017 Andou ................ B41J 2/33595
2022/0176712 A1* 6/2022 Kiguchi .................... B41J 2/35

FOREIGN PATENT DOCUMENTS

JP S61-019374 A 1/1986
JP H06-340101 A 12/1994
JP H09-109428 A 4/1997
JP H09-234895 A 9/1997
JP 2021-146512 A 9/2021

* cited by examiner

*Primary Examiner* — Kristal Feggins
(74) *Attorney, Agent, or Firm* — HAUPTMAN HAM, LLP

(57) ABSTRACT

A thermal head includes a substrate, a heat storage layer located on the substrate, and a heat generating part located on the heat storage layer. A transport direction of a recording medium is defined as a first direction, a direction opposite to the first direction is defined as a second direction, and in the heat storage layer, a thickness of a portion located under an end portion of the heat generating part on a side of the second direction is thicker than a thickness of a portion located under an end portion of the heat generating part on a side of the first direction.

15 Claims, 8 Drawing Sheets

THERMAL HEAD AND THERMAL PRINTER

CROSS-REFERENCE TO RELATED APPLICATIONS

This application is national stage application of International Application No. PCT/JP2022/044409, filed on Dec. 1, 2022, which designates the United States, and which claims the benefit of priority from Japanese Patent Application No. 2021-211727, filed on Dec. 24, 2021.

TECHNICAL FIELD

Embodiments of this disclosure relate to a thermal head and a thermal printer.

BACKGROUND OF INVENTION

Various kinds of thermal heads for printing devices such as facsimile machines and video printers have been proposed in the related art (see, for example, Patent Document 1).

CITATION LIST

Patent Literature

Patent Document 1: JP 9-234895 A

SUMMARY

A thermal head of the present disclosure includes a substrate, a heat storage layer located on the substrate, and a heat generating part located on the heat storage layer. A transport direction of a recording medium is defined as a first direction, a direction opposite to the first direction is defined as a second direction, and in the heat storage layer, a thickness of a portion located under an end portion of the heat generating part on a side of the second direction is thicker than a thickness of a portion located under an end portion of the heat generating part on a side of the first direction.

DESCRIPTION OF EMBODIMENTS

Various kinds of thermal heads for printing devices such as facsimile machines and video printers have been proposed in the related art. Unfortunately, the related art has room for further improvement in terms of providing both high speed of the thermal head and good printing quality.

Thus, achieving a technique that can solve the above-described problems and provide both high speed and good printing quality in the thermal head has been awaited.

Embodiments of a thermal head and a thermal printer disclosed in the present application will be described below with reference to the accompanying drawings. Note that the disclosure is not limited by the following embodiments.

Embodiments can be appropriately combined so as not to contradict each other in terms of processing content. In the following embodiments, the same portions are denoted by the same reference signs, and redundant explanations are omitted.

In the embodiments described below, expressions such as “constant”, “orthogonal”, “perpendicular”, and “parallel” may be used, but these expressions do not mean exactly “constant”, “orthogonal”, “perpendicular”, and “parallel”. That is, each of the expressions described above allows for deviations in, for example, manufacturing accuracy, installation accuracy, and the like.

Overall Configuration of Thermal Head

Figure 1:
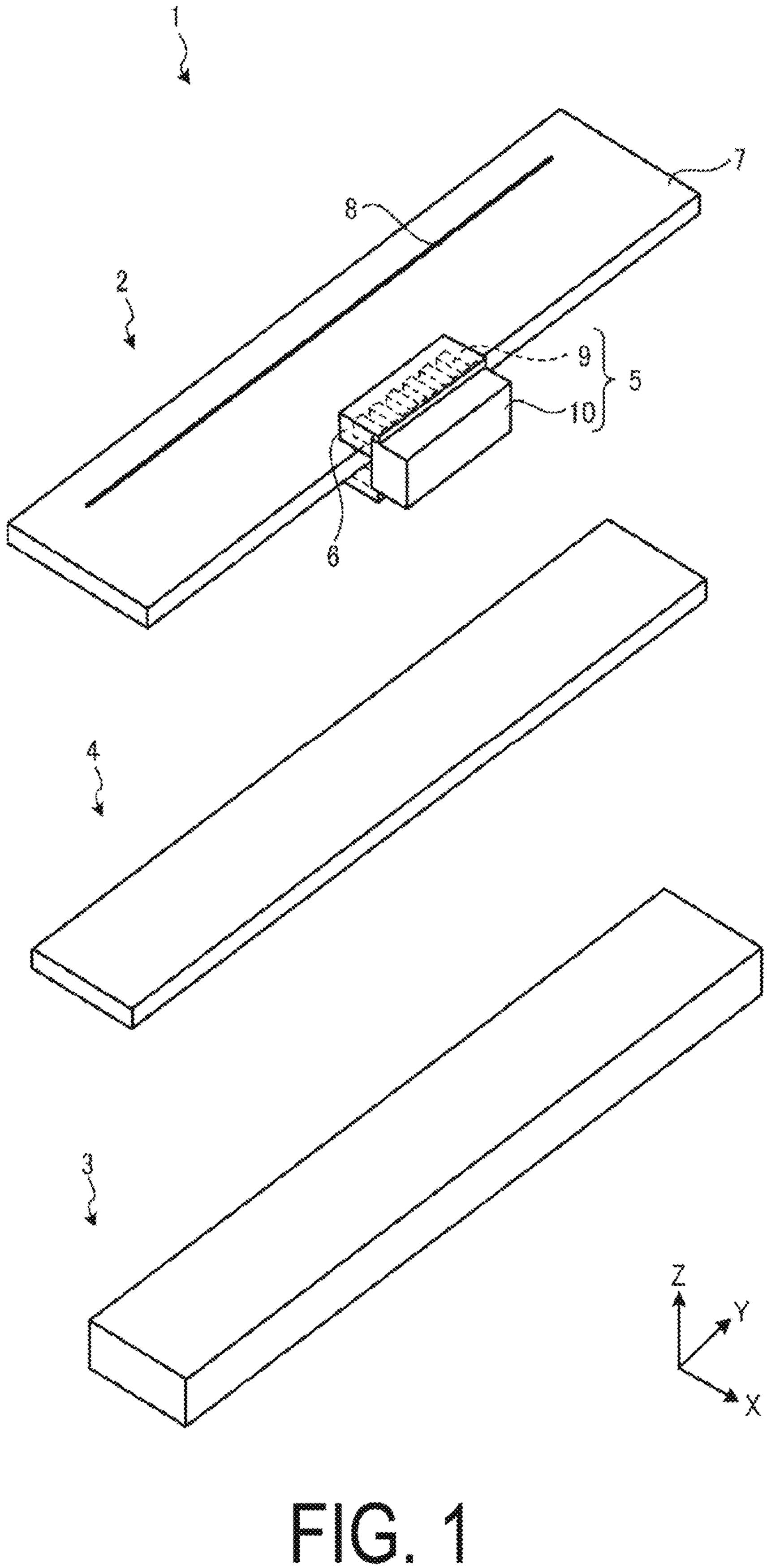
FIG. 1 is a view schematically illustrating a configuration of a thermal head according to an embodiment.

First, an overall configuration of a thermal head 1 according to an embodiment will be described with reference to FIGS. 1 to 3. FIG. 1 is a view schematically illustrating a configuration of the thermal head 1 according to an embodiment.

Note that in the following description, an XYZ orthogonal coordinate system may be set, and the positional relationship between respective portions may be described by referring to the XYZ orthogonal coordinate system. A predetermined direction in a horizontal plane is defined as an X axis direction, a direction orthogonal to the X axis direction in the horizontal plane is defined as a Y axis direction, and a direction orthogonal to each of the X axis direction and the Y axis direction is defined as a Z axis direction. The XY plane including the X axis and the Y axis is parallel to the horizontal plane.

In the following description, there is a case where a surface in which a substrate 7 included in the thermal head 1 is fitted to a connector 5 may be parallel to a horizontal plane. The Z axis direction orthogonal to the XY plane is a vertical direction. In the following description, a direction perpendicular to the surface in which the substrate 7 included in the thermal head 1 is fitted to the connector 5 may be parallel to the Z axis.

As illustrated in FIG. 1, the thermal head 1 according to the embodiment includes a head base 2, a heat dissipation plate 3, a bonding member 4, the connector 5, and a sealing member 6.

For example, the head base 2 is formed in a substantially rectangular parallelepiped shape and is mounted on the heat dissipation plate 3 via the bonding member 4. Each member constituting the thermal head 1 is provided on the substrate 7 of the head base 2.

Figure 12:
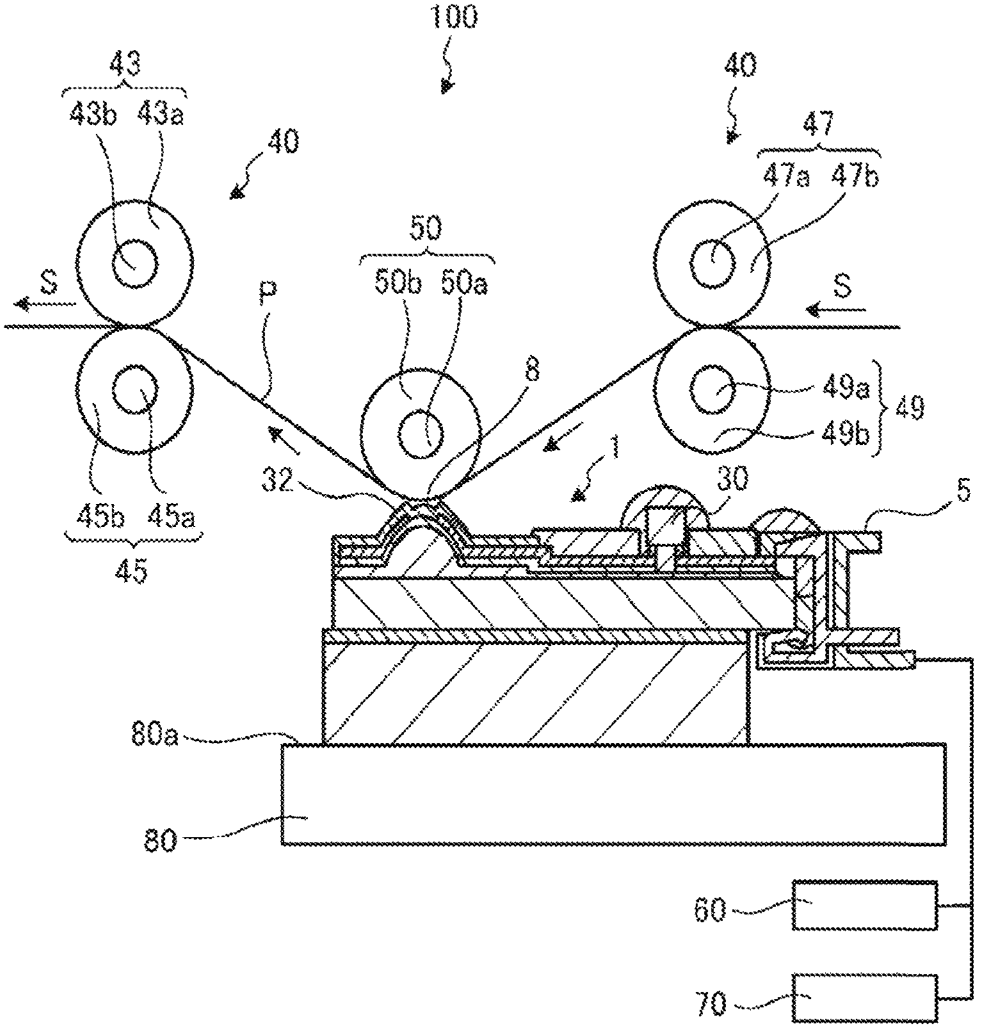
FIG. 12 is a view schematically illustrating a configuration of a thermal printer according to the embodiment.

The head base 2 applies a voltage in accordance with an electrical signal supplied from the outside via the connector 5 to cause heat generating parts 8 to generate heat, thereby performing printing on a recording medium P (see FIG. 12). Note that the members constituting the thermal head 1 will be described below with reference to FIGS. 2 and 3, and the recording medium P will be described below with reference to FIG. 12.

The connector 5 is bonded to the head base 2 by the sealing member 6 and electrically connects the outside and the head base 2 to each other. The bonding member 4 bonds the head base 2 and the heat dissipation plate 3.

The heat dissipation plate 3 is formed, for example, in a substantially rectangular parallelepiped shape and is provided to dissipate heat of the head base 2. The heat dissipation plate 3 is made of, for example, a metal material such as copper, iron, or aluminum, and has a function of dissipating the heat generated by the heat generating parts 8 of the head base 2, especially heat not contributing to printing.

Figure 2:
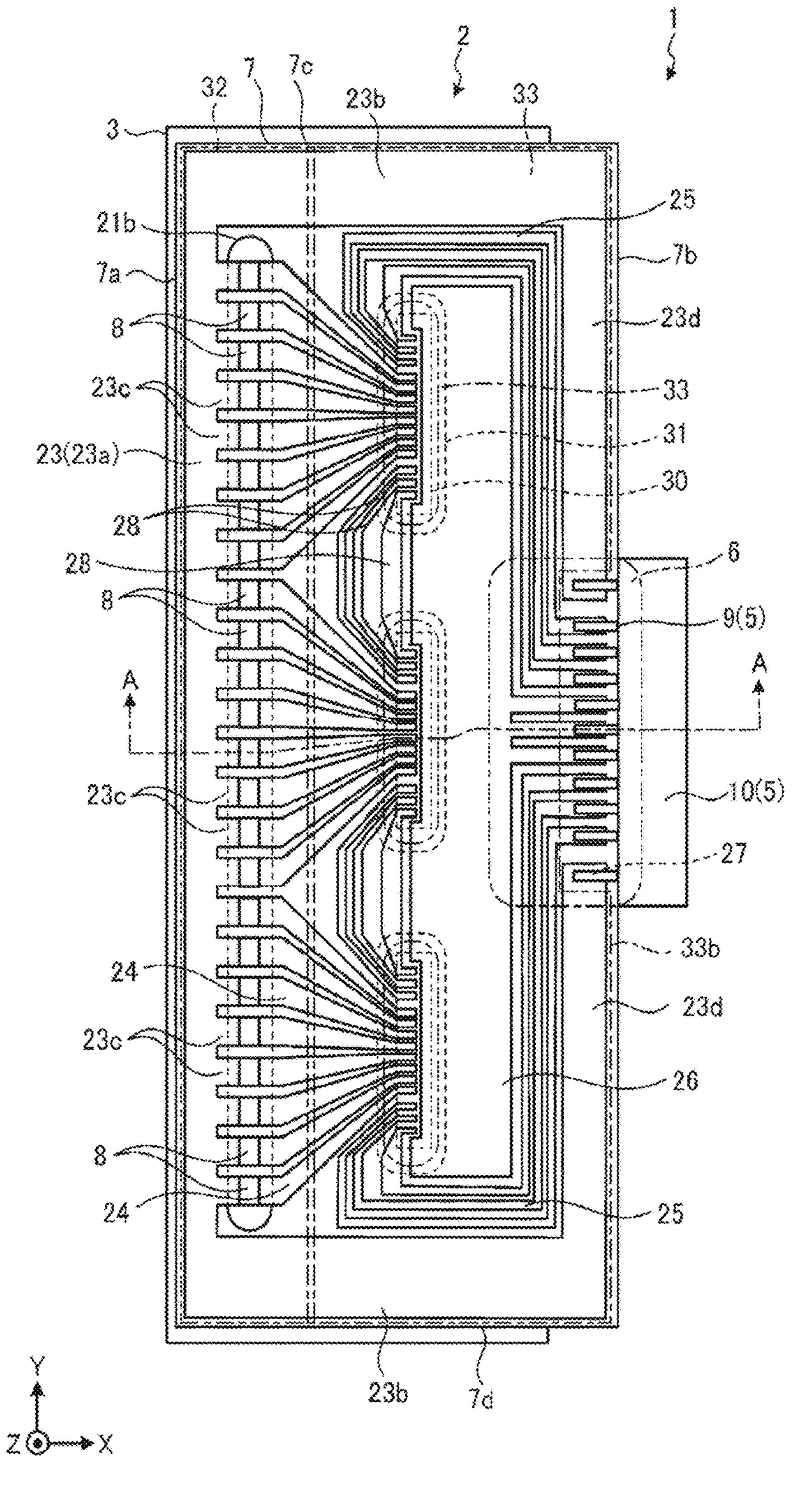
FIG. 2 is a plan view illustrating an overall configuration of the thermal head illustrated in FIG. 1.
Figure 3:
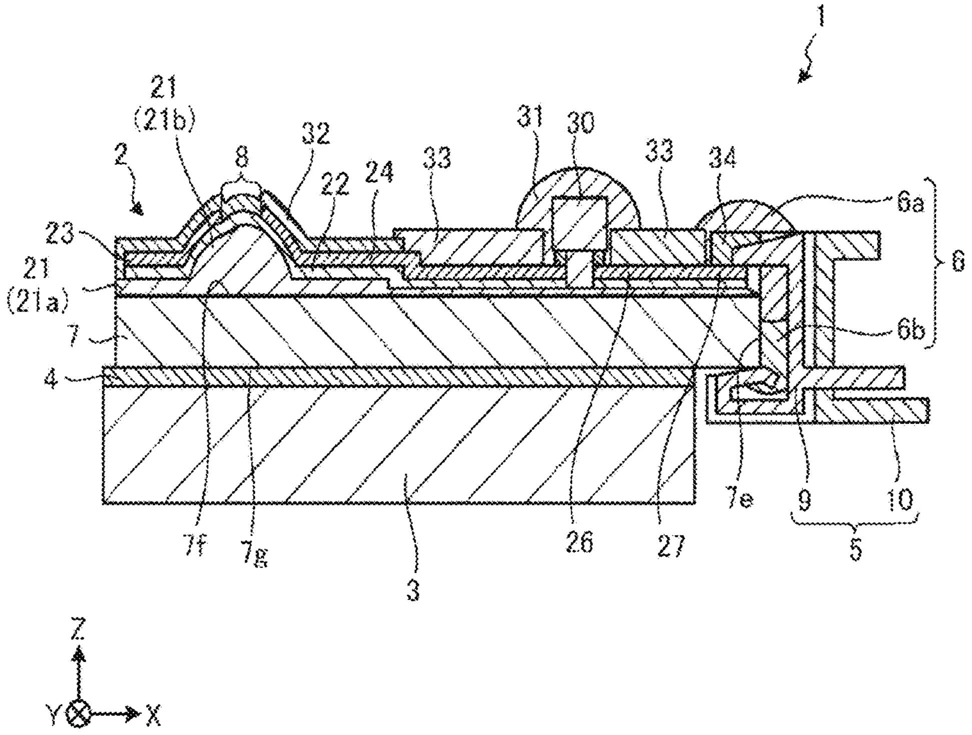
FIG. 3 is a cross-sectional view taken along a line A-A in a direction of arrows illustrated in FIG. 2.

Each of the members constituting the thermal head 1 will be further described using FIGS. 2 and 3. FIG. 2 is a plan view illustrating an overall configuration of the thermal head 1 illustrated in FIG. 1. FIG. 3 is a cross-sectional view taken along a line A-A in a direction of arrows illustrated in FIG. 2.

As illustrated in FIGS. 2 and 3, the thermal head 1 further includes the substrate 7, a heat storage layer 21, a resistance layer 22, a common electrode 23, individual electrodes 24, first connection electrodes 25, a ground electrode 26, connection terminals 27, second connection electrodes 28, drive ICs 30, a hard coat 31, a protective layer 32, a coating layer 33, and a bonding member 34.

The substrate 7 has a rectangular shape in plan view, and has a first long side 7*a*, a second long side 7*b*, a first short side 7*c*, a second short side 7*d*, a side surface 7*e*, a first surface 7*f*, and a second surface 7*g*. The substrate 7 is made of, for example, an electrically insulating material such as an alumina ceramic or a semiconductor material such as monocrystalline silicon.

Hereinafter, for convenience of description, the first surface 7*f* may be referred to as an "upper surface" and the second surface 7*g* may be referred to as a "lower surface". Similarly, with reference to the side surface 7*e*, the first surface 7*f* side may be referred to as "upper" or "above", and the second surface 7*g* side may be referred to as "lower" or "below".

The connector 5 is provided on the side surface 7*e* of the substrate 7. The connector 5 is fixed to the side surface 7*e* by connector pins 9, the bonding member 34, and the sealing member 6. The bonding member 34 has electrical conductivity and is disposed between each of the connection terminals 27 and a respective one of the connector pins 9. Examples of the bonding member 34 may include solder, and anisotropic conductive paste.

Note that a pad portion (not illustrated) which is a metal plating layer made of Ni, Au, or Pd is provided between the bonding member 34 and the connection terminals 27. Note that the bonding member 34 does not need to be provided.

The connector 5 includes a plurality of the connector pins 9 and a housing 10 accommodating the plurality of connector pins 9. A first end portion of each of the plurality of connector pins 9 is exposed to the outside of the housing 10, and a second end portion of each of the plurality of connector pins 9 is accommodated in the inside of the housing 10. Each of the plurality of connector pins 9 is electrically connected to a respective one of the connection terminals 27 of the head base 2 and is electrically connected to various electrodes of the head base 2.

The sealing member 6 includes a first sealing member 6*a* and a second sealing member 6*b*. The first sealing member 6*a* is located on the first surface 7*f* side of the substrate 7, and the second sealing member 6*b* is located on the second surface 7*g* side of the substrate 7. The first sealing member 6*a* is provided so as to seal the connector pins 9 and the various electrodes, and the second sealing member 6*b* is provided so as to seal contact portions between the connector pins 9 and the substrate 7.

The sealing member 6 is provided so that the connection terminals 27 and the connector pins 9 are not exposed to the outside. The sealing member 6 can be made of, for example, an epoxy-based thermosetting resin, an ultraviolet curable resin, or a visible light curable resin.

The bonding member 4 is disposed on the heat dissipation plate 3 and bonds the second surface 7*g* of the substrate 7 and the heat dissipation plate 3. Examples of the bonding member 4 may include a double-sided tape and a resin adhesive.

The heat storage layer 21 is located on the first surface 7*f* of the substrate 7. The heat storage layer 21 includes an underlying portion 21*a* and a raised portion 21*b*. The underlying portion 21*a* is located over the entire first surface 7*f* of the substrate 7. The raised portion 21*b* rises in the thickness direction of the substrate 7 from the underlying portion 21*a*. In other words, the raised portion 21*b* protrudes in a direction away from the first surface 7*f* of the substrate 7.

The raised portion 21*b* is located adjacent to the first long side 7*a* of the substrate 7 and extends along a main scanning direction. The raised portion 21*b* has a substantially semi elliptical cross section. Thus, the protective layer 32 located on the heat generating parts 8 favorably comes into contact with the recording medium P to be printed (see FIG. 12).

The height of the heat storage layer 21 including the underlying portion 21*a* and the raised portion 21*b* from the first surface 7*f* of the substrate 7 may be set from 15 μm to 90 μm.

The heat storage layer 21 is made of a material such as a glass having low thermal conductivity and has a function of temporarily accumulating part of heat generated by the heat generating part 8. As a result, the heat storage layer 21 can shorten the time required to raise the temperature of the heat generating parts 8. As a result, the heat storage layer 21 functions to enhance the thermal response properties of the thermal head 1.

The heat storage layer 21 is formed by, for example, applying, on the upper surface of the substrate 7, a predetermined glass paste obtained by mixing a glass powder with an appropriate organic solvent by screen printing or the like and firing the glass paste.

In the present disclosure, the heat storage layer 21 is not limited to a glaze layer made of a glass material. The heat storage layer 21 is made of, for example, a dielectric body such as silicon oxide, and may be formed by various vapor phase synthesis (for example, physical vapor deposition (PVD) or chemical vapor deposition (CVD)).

The resistance layer 22 is provided on the substrate 7 and the heat storage layer 21. The various electrodes constituting the head base 2 are provided on the resistance layer 22.

The resistance layer 22 is patterned in substantially the same shape as the various electrodes constituting the head base 2, and includes an exposed region where the resistance layer 22 is exposed between the common electrode 23 and the individual electrode 24. Each of a plurality of the heat generating parts 8 is disposed in the exposed region.

The plurality of heat generating parts 8 is arranged on the heat storage layer 21 along the longitudinal direction of the substrate 7. The plurality of heat generating parts 8 is disposed at a predetermined interval between the first short side 7*c* and the second short side 7*d* along the lateral direction among the sides of the first surface 7*f* of the substrate 7.

The heat generating parts 8 have a function of generating heat in accordance with the electrical signal supplied from the outside to thermally transfer an ink of an ink sheet (not illustrated) to the recording medium P. The plurality of heat generating parts 8 is disposed at a density of, for example, from 100 dpi to 2400 dpi (dot per inch).

Note that the arrangement of the resistance layer 22 constituting the heat generating parts 8 is not limited to that illustrated in the drawing, and the resistance layer 22 may be provided only between the common electrode 23 and the individual electrode 24, for example.

The resistance layer 22 is made of, for example, a material having a relatively high electric resistance, such as a TaN-based material, a TaSiO-based material, a TaSiNO-based material, a TiSiO-based material, a TiSiCO-based material, or a NbSiO-based material. The common electrode 23 and the individual electrode 24 are made of a metal such as Al or Cu.

When a voltage is applied to the resistance layer 22 disposed between the common electrode 23 and the individual electrode 24, the resistance layer 22 generates heat by Joule heating and functions as the heat generating part 8. In other words, a portion of the resistance layer 22 located between the common electrode 23 and the individual electrode 24 functions as the heat generating part 8.

The common electrode 23 includes main wiring portions 23*a* and 23*d*, sub wiring portions 23*b*, and lead portions 23*c*. The common electrode 23 electrically connects the plurality of heat generating parts 8 and the connector 5 to each other. The main wiring portion 23*a* extends along the first long side 7*a* of the substrate 7. The sub wiring portions 23*b* extend along each of the first short side 7*c* and the second short side 7*d* of the substrate 7.

The lead portions 23*c* individually extend from the main wiring portion 23*a* toward the plurality of heat generating parts 8, respectively. The main wiring portion 23*d* extends along the second long side 7*b* of the substrate 7.

The individual electrode 24 electrically connect the heat generating part 8 and the drive IC 30 to each other. Specifically, the plurality of heat generating parts 8 is divided into a plurality of groups. The individual electrodes 24 respectively electrically connect the plurality of heat generating parts 8 constituting each of the groups and the drive IC 30 of a corresponding group to each other. The drive IC 30 will be described below.

The first connection electrode 25 electrically connects the drive IC 30 and the connector 5 to each other. A plurality of the first connection electrodes 25 is connected to each of the drive ICs 30, and each of the first connection electrodes 25 is constituted by one or a plurality of wirings each having a different function.

The ground electrode 26 is surrounded by the individual electrodes 24, the first connection electrodes 25, and the main wiring portion 23*d* of the common electrode 23. The ground electrode 26 is held at a ground potential from 0 V to 1 V.

A pad portion (not illustrated) which is a metal plating layer for solder connection between the connector 5 and the substrate 7 (connection terminals 27) is provided on an upper portion of each electrode layer of the common electrode 23, the individual electrodes 24, the first connection electrodes 25, and the ground electrode 26.

The pad portion is made of, for example, a metal material such as Au. The pad portion may be made of Ni or Pd instead of Au. A solder bonding portion between the connector 5 and the substrate 7 (the connection terminals 27) is covered with the sealing member 6.

The connection terminal 27 is provided on the second long side 7*b* side of the substrate 7 and connects the common electrode 23, a respective one of the individual electrodes 24, a respective one of the first connection electrodes 25, and the ground electrode 26 to the connector 5. The connection terminal 27 is provided so as to correspond to the connector pin 9, and when the connector 5 is connected, the connector pin 9 and the connection terminal 27 are connected so as to be electrically independent of each other.

A protective resin layer (not illustrated) is provided on the upper surface (contact surface with the connector pin 9) of the connection terminal 27.

The second connection electrodes 28 electrically connect the drive ICs 30 adjacent to each other. The second connection electrodes 28 are provided so as to correspond to the first connection electrodes 25, respectively, and each transmits various signals to the drive ICs 30 adjacent to each other.

The resistance layer 22 and the various electrodes can be formed, for example, as follows. The materials constituting these are sequentially layered on the heat storage layer 21 by, for example, a thin film forming technique such as a sputtering method.

Then, the resistance layer 22 and the various electrodes are formed by processing the laminate body into a predetermined pattern by using conventionally known photoetching or the like. As described above, the various electrodes are electrically connected to the heat generating part 8. The various electrodes may have a thickness from 0.1 μm to 1 μm, for example.

The drive IC 30 is disposed on the first surface 7*f* side of the substrate 7, for example. Each of the plurality of drive ICs 30 is arranged along an arrangement direction of the heat generating parts 8 so as to correspond to the group of the heat generating parts 8 assigned to each drive IC 30.

The drive IC 30 is connected to end portions of the individual electrodes 24 on the drive IC 30 side and end portions of the first connection electrodes 25 on the drive IC 30 side, and supplies electrical power for individually causing the respective heat generating parts 8 to generate heat to the heat generating parts 8 in accordance with the electrical signal supplied from the outside. A switching member including a plurality of switching elements inside, for example, may be used for the drive IC 30.

The protective layer 32 is located on the heat storage layer 21 formed on an upper surface 7*f* of the substrate 7 to cover the heat generating parts 8, the common electrode 23 and the individual electrodes 24. More specifically, the protective layer 32 is provided so as to cover a part of each of the individual electrodes 24 from the edges of the substrate 7, that is, the first long side 7a, the first short side 7c, and the second short side 7d of the substrate 7.

The protective layer 32 protects the heat generating parts 8, the common electrode 23 and the individual electrodes 24 in a region covering thereof from corrosion due to deposition of moisture and the like contained in the atmosphere, or from wear due to contact with the recording medium P to be printed.

The protective layer 32 may be made of, for example SiN, $SiO_2$, SiON, SiC, and diamond-like carbon. The protective layer 32 may be a single layer or a plurality of layers.

The coating layer 33 is disposed on the substrate 7 so as to partially cover the common electrode 23, the individual electrodes 24, the first connection electrodes 25, and the protective layer 32. The coating layer 33 protects the covered region from oxidation due to contact with the atmosphere or from corrosion due to deposition of moisture and the like contained in the atmosphere.

The coating layer 33 is in close contact with the protective layer 32 and covers the end portion of the protective layer 32, thereby reducing the occurrence of a problem in which the protective layer 32 is peeled off from, for example, a protection target such as the heat generating parts 8 or the various electrodes.

The coating layer 33 is made of, for example, a resin material such as an epoxy resin, a polyimide resin, or a silicone resin. Any of these resin materials has fluidity before being cured to form the coating layer 33.

An opening (not illustrated) for exposing each of the individual electrodes 24 and each of the first connection electrodes 25 connected to the drive IC 30 are formed in the coating layer 33. Each of the wirings is connected to the drive IC 30 via the opening.

The drive IC 30 is sealed by the hard coat 31 in a state of being connected to the individual electrodes 24 and the first connection electrodes 25. This protects the drive IC 30 or connecting portions between the drive IC 30 and these electrodes. The hard coat 31 is made of, for example, a resin such as an epoxy resin or a silicone resin.

Details of Thermal Head

Figure 4:
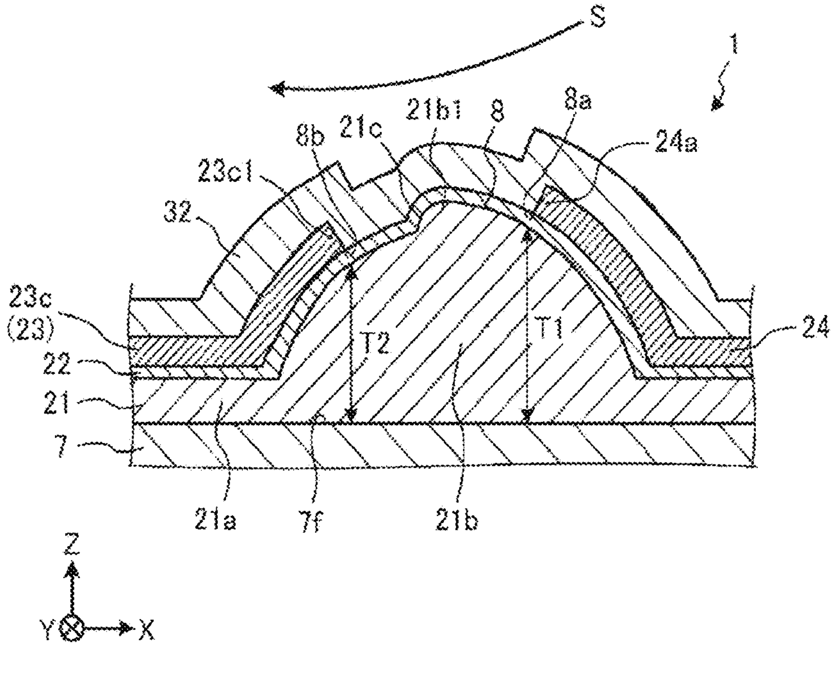
FIG. 4 is a cross-sectional view illustrating an example of a main portion of the thermal head according to the embodiment.

Details of the configuration of the thermal head 1 according to the embodiment will be described with reference to FIG. 4. FIG. 4 is a cross-sectional view illustrating an example of the main portion of the thermal head 1 according to the embodiment.

As illustrated in FIG. 4, the heat generating part 8 is provided at an apex portion 21b1 and in the vicinity thereof in the raised portion 21b of the heat storage layer 21. The heat generating part 8 is a portion of the resistance layer 22 between the individual electrode 24 located on the upstream side of the apex portion 21b1 in transport direction S of the recording medium P (see FIG. 12) and the lead portion 23c of the common electrode 23 located on the downstream side of the apex portion 21b1.

Specifically, between a tip portion 24a of the individual electrode 24 and a tip portion 23c1 of the lead portion 23c of the common electrode 23, a current flows through the resistance layer 22 having a relatively high electric resistance, so that the resistance layer 22 generates heat. This allows the above-described site of the resistance layer 22 to function as the heat generating part 8.

The heat generating part 8 includes a first site 8a and a second site 8b. The transport direction S is defined as a first direction, a direction opposite to the first direction is defined as a second direction, and the first site 8a is an end portion on the second direction side (hereinafter, also referred to as the upstream side) of the heat generating part 8. That is, the first site 8a is a site in contact with the tip portion 24a of the individual electrode 24 located on the upstream side of the heat generating part 8 in the transport direction S.

The second site 8b is an end portion on the first direction side (hereinafter, also referred to as the downstream side) of the heat generating part 8 in the transport direction S. That is, the second site 8b is a site in contact with the tip portion 23c1 of the lead portion 23c located on the downstream side of the heat generating part 8 in the transport direction S.

Here, in the embodiment, in the heat storage layer 21, a thickness T1 of a portion located under the first site 8a is thicker than a thickness T2 of a portion located under the second site 8b. Note that, in the present disclosure, "under the first site 8a (or the second site 8b)" refers to a direction from the first site 8a (or the second site 8b) toward the first surface 7f of the substrate 7 perpendicularly.

This improves a heat storage property around the first site 8a more than the heat storage property around the second site 8b, allowing the temperature of the first site 8a to be made higher than the temperature of the second site 8b.

By increasing the temperature of the first site 8a, when the recording medium P having a low temperature (for example, about room temperature) is transported to the heat generating part 8, the temperature of the recording medium P can be rapidly increased at the first site 8a.

That is, in the embodiment, by increasing the temperature of the first site 8a, printing can be quickly performed on a designated portion in the recording medium P.

Further, by lowering the temperature of the second site 8b, the occurrence of a so-called tailing phenomenon can be reduced. In the tailing phenomenon, after printing is performed at the designated position on the upstream side, printing is unexpectedly performed excessively at a high temperature also on the downstream side.

That is, in the embodiment, by lowering the temperature of the second site 8b, printing with good quality can be performed on the designated portion in the recording medium P.

Figure 5:
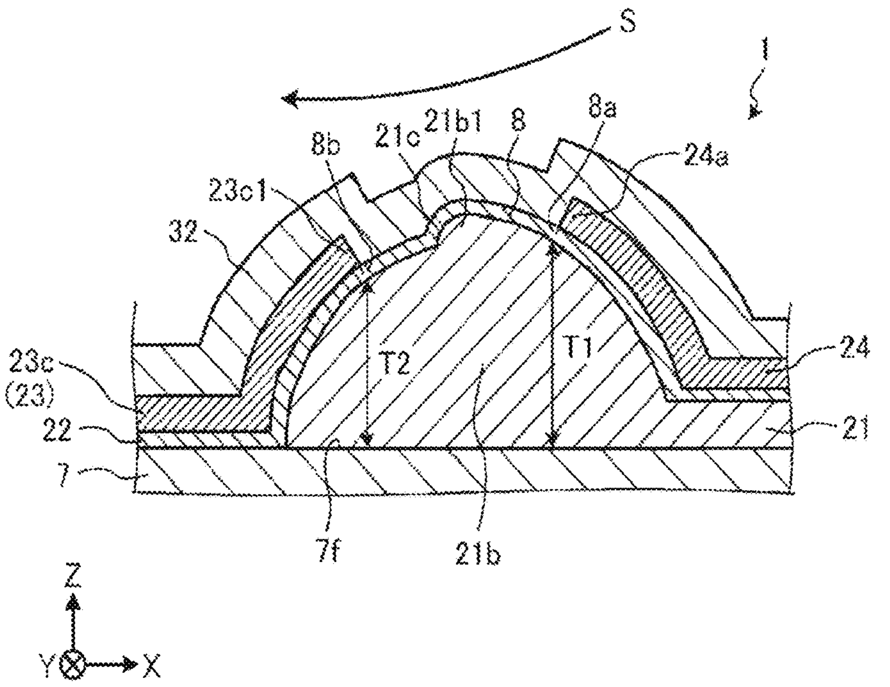
FIG. 5 is a cross-sectional view illustrating another example of the main portion of the thermal head according to the embodiment.

In the embodiment, as illustrated in FIG. 5, the underlying portion 21a located downstream of the raised portion 21b need not be provided. In a case where the underlying portion 21a is not provided, the temperature of the second site 8b is likely to be further lowered, and thus printing with further good quality can be performed on the designated portion in the recording medium P.

As described above, according to an embodiment, in the heat storage layer 21, making the thickness T1 of the portion located under the first site 8a thicker than the thickness T2 of the portion located under the second site 8b can provide both high speed of the thermal head 1 and good printing quality.

In the embodiment, a stepped portion 21c is provided in the vicinity of the apex portion 21b1 in the heat storage layer 21. The stepped portion 21c is formed in the vicinity of the apex portion 21b1 by the heat storage layer 21 being rapidly thinned as the heat storage layer 21 proceed in the transport direction S.

As described above, the stepped portion 21c is provided between the first site 8a and the second site 8b, and thus in the heat storage layer 21, the thickness T1 of the portion located under the first site 8a can be made thicker than the thickness T2 of the portion located under the second site 8b.

In the embodiment, the stepped portion 21c need not be provided so as to rise perpendicularly to the first surface 7f of the substrate 7, and the stepped portion 21c may be provided so that the thickness of the heat storage layer 21 changes along a curved surface in the stepped portion 21*c*.

This can reduce formation of a site where a corner is raised in the protective layer 32 provided on the stepped portion 21*c*. Thus, the embodiment can reduce, when the recording medium P is pressed against the heat generating part 8 by a platen roller 50 (see FIG. 12), a failure that the recording medium P tears by providing the site where the corner is raised in the protective layer 32.

As a method of forming the stepped portion 21*c*, the downstream side of the raised portion 21*b* may be removed by etching such as photolithography, or the upstream side of the raised portion 21*b* may be formed thick by performing a printing step of the heat storage layer 21 a plurality of times.

Another Embodiment 1

Figure 6:
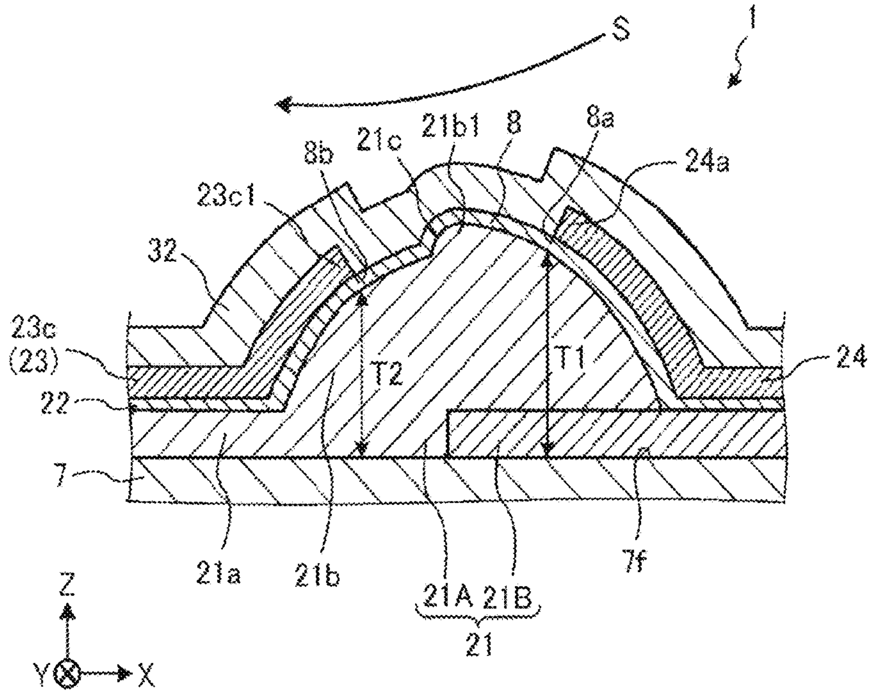
FIG. 6 is a cross-sectional view illustrating an example of the main portion of the thermal head according to another embodiment 1.

The thermal head 1 according to another embodiment will be described with reference to FIGS. 6 to 11. FIG. 6 is a cross-sectional view illustrating an example of the main portion of the thermal head 1 according to another embodiment 1.

As illustrated in FIG. 6, in another embodiment 1, the configuration of the heat storage layer 21 differs from the embodiment described above. Specifically, in another embodiment 1, the heat storage layer 21 includes a first heat storage layer 21A and a second heat storage layer 21B. The second heat storage layer 21B is made of a material having thermal conductivity lower than that of the first heat storage layer 21A.

In another embodiment 1, the second heat storage layer 21B is disposed between the first site 8*a* of the heat generating part 8 and the substrate 7, but is not disposed between the second site 8*b* of the heat generating part 8 and the substrate 7. This allows, in the heat storage layer 21 in the vicinity of the first site 8*a*, heat generated by the heat generating part 8 to be further favorably accumulated.

Thus, according to another embodiment 1, the temperature of the recording medium P (see FIG. 12) can be increased further quickly at the first site 8*a*, so that further high speed of the thermal head 1 can be achieved.

In another embodiment 1, the second heat storage layer 21B is located between the substrate 7 and the first heat storage layer 21A. This allows the heat storage layer 21 of another embodiment 1 to be formed by forming the second heat storage layer 21B in the printing step and then forming the first heat storage layer 21A in the printing step, allowing a manufacturing step of the thermal head 1 to be simplified.

Another Embodiment 2

Figure 7:
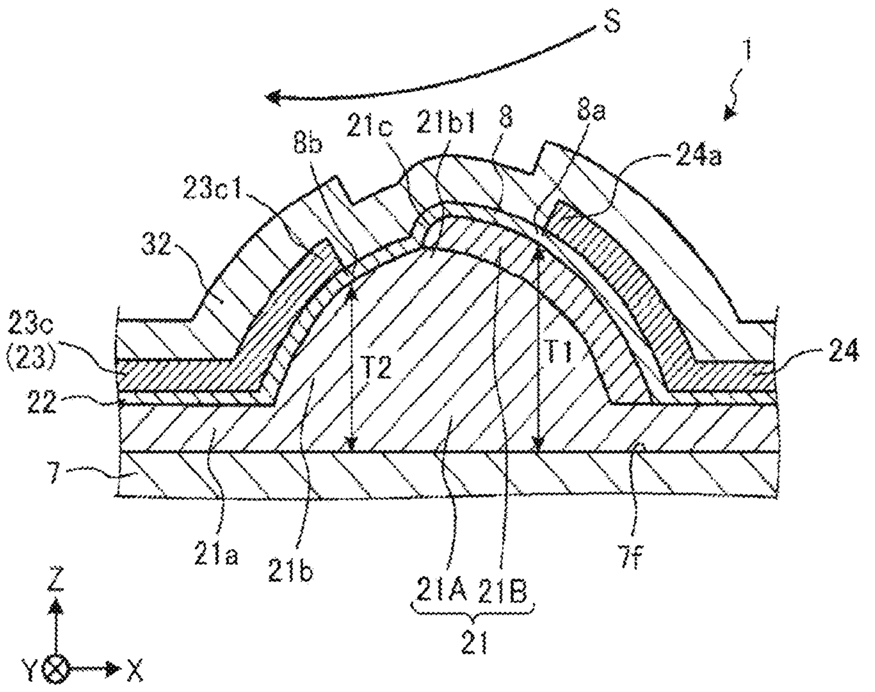
FIG. 7 is a cross-sectional view illustrating an example of the main portion of the thermal head according to another embodiment 2.

FIG. 7 is a cross-sectional view illustrating an example of the main portion of the thermal head 1 according to another embodiment 2. As illustrated in FIG. 7, in another embodiment 2, the arrangement of the heat storage layer 21 differs from another embodiment 1 described above. Specifically, in another embodiment 2, the second heat storage layer 21B is located between the first heat storage layer 21A and the heat generating part 8 (i.e., between the first heat storage layer 21A and the resistance layer 22).

This allows, the heat generated by the heat generating part 8 to be accumulated at a position close to the heat generating part 8, allowing the heat generated by the heat generating part 8 to be further favorably accumulated.

Thus, according to another embodiment 2, the temperature of the recording medium P (see FIG. 12) can be increased further quickly at the first site 8*a*, so that further high speed of the thermal head 1 can be achieved.

Figure 8:
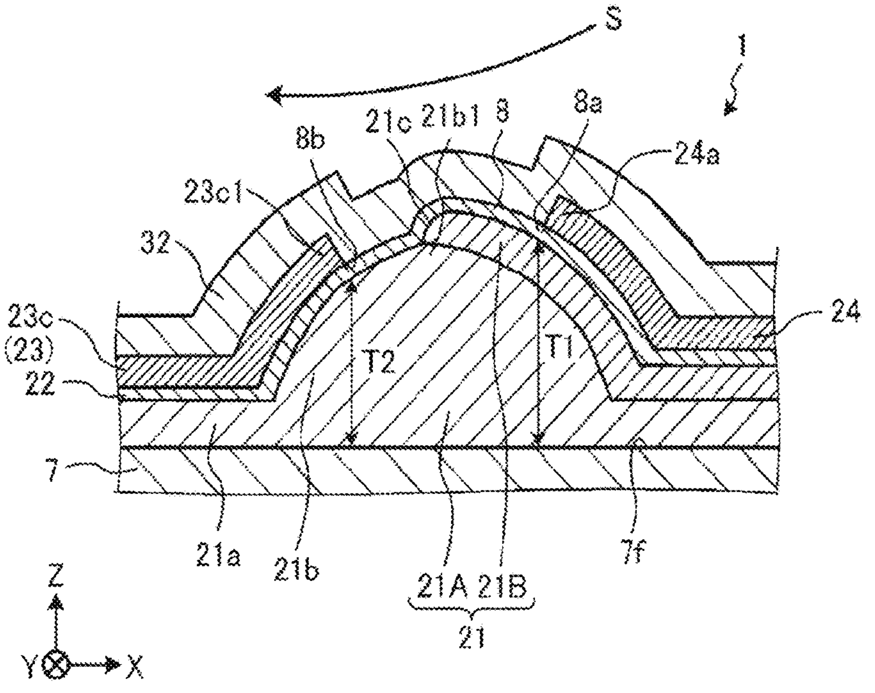
FIG. 8 is a cross-sectional view illustrating another example of the main portion of the thermal head according to another embodiment 2.

Further, in another second embodiment 2, as illustrated in FIG. 8, the second heat storage layer 21B may be extended to below a flat portion of the individual electrode 24. This allows the heat generated by the heat generating part 8 to be further favorably accumulated, which is more advantageous for high speed.

Another Embodiment 3

Figure 9:
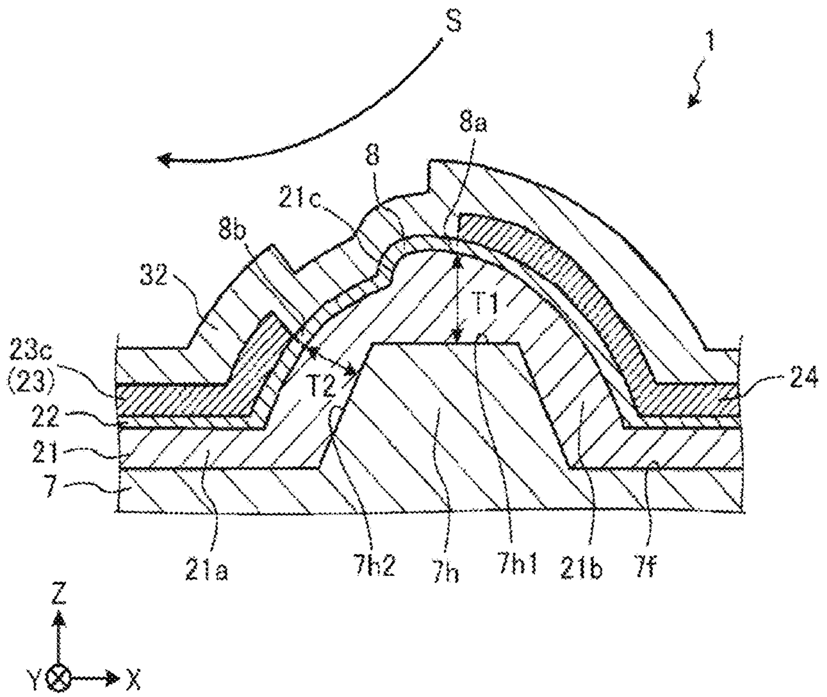
FIG. 9 is a cross-sectional view illustrating an example of the main portion of the thermal head according to another embodiment 3.

FIG. 9 is a cross-sectional view illustrating an example of the main portion of the thermal head 1 according to another embodiment 3. As illustrated in FIG. 9, in another embodiment 3, the configuration of the substrate 7 differs from the embodiment described above. Specifically, in another embodiment 3, a protruding portion 7*h* is located on the first surface 7*f* of the substrate 7, and the heat generating part 8 is provided on the protruding portion 7*h*.

The protruding portion 7*h* has, for example, a trapezoidal shape in a cross-sectional view. The upper surface 7*h*1 and a side surface 7*h*2 which are part of the first surface 7*f* are provided to the protruding portion 7*h*. The side surface 7*h*2 is a side surface of the protruding portion 7*h* on the downstream side in the transport direction S.

In another embodiment 3, the raised portion 21*b* of the heat storage layer 21 is provided so as to cover the protruding portion 7*h*, and the heat generating part 8 is provided in a region from the vicinity of the apex portion to a downstream portion on the raised portion 21*b*.

In another embodiment 3, in the heat storage layer 21, the thickness T1 of the portion located under the first site 8*a* is thicker than the thickness T2 of the portion located under the second site 8*b* as in the embodiment described above. Note that in another embodiment 3, in the heat storage layer 21, the thickness T1 of the portion located under the first site 8*a* corresponds to s distance between the first site 8*a* and the upper surface 7*h*1 of the protruding portion 7*h*, and the thickness T2 of the portion located under the second site 8*b* corresponds to s distance between the second site 8*b* and the side surface 7*h*2 of the protruding portion 7*h*.

This allows, in another embodiment 3, both high speed of the thermal head 1 and good printing quality to be provided as in the embodiment.

In another embodiment 3, the heat storage layer 21 and the heat generating part 8 are located across a plurality of surfaces (here, the upper surface 7*h*1 and the side surface 7*h*2) of the substrate 7. An angle formed by the upper surface 7*h*1 facing the first site 8*a* and the printing surface of the recording medium P is smaller than an angle formed by the side surface 7*h*2 facing the second site 8*b* and the printing surface of the recording medium P.

This allows, on the upstream side in the transport direction S, the recording medium P (see FIG. 12) and the upper surface 7*h*1 to be substantially parallel to each other and face each other at a relatively small angle, allowing a pressing pressure against the recording medium P to be increased.

On the other hand, on the downstream side in the transport direction S, since the recording medium P and the side surface 7*h*2 are inclined to each other and face each other at a relatively large angle, so that the pressing pressure against the recording medium P can be weakened.

That is, in another embodiment 3, the heat transfer efficiency from the heat generating part 8 to the recording medium P can be improved on the upstream side, and excessive heat transfer from the heat generating part 8 to the recording medium P can be reduced on the downstream side.

Thus, another embodiment 3 can provide both high speed of the thermal head 1 and good printing quality at a high level.

Figure 10:
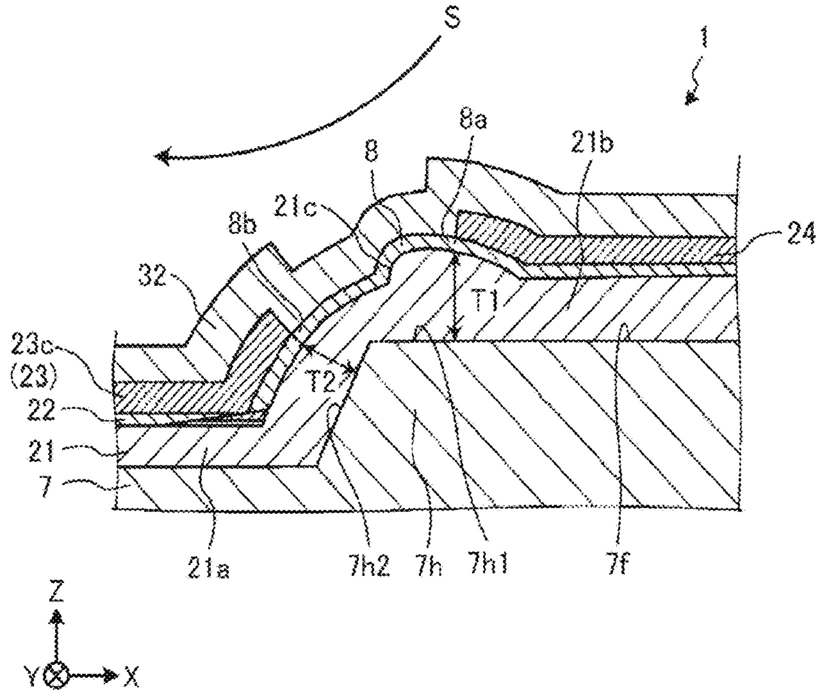
FIG. 10 is a cross-sectional view illustrating another example of the main portion of the thermal head according to another embodiment 3.

In another embodiment 3, as illustrated in FIG. 10, the surface of the upper surface 7*h*1 of the protruding portion 7*h* and the surface of the first surface 7*f* may be the same surface, and the first surface 7*f* and the upper surface 7*h*1 to the side surface 7*h*2 may have a so-called step shape. Also in another embodiment 3, the heat transfer efficiency from the heat generating part 8 to the recording medium P can be improved on the upstream side, and excessive heat transfer from the heat generating part 8 to the recording medium P can be reduced on the downstream side. Thus, both high speed of the thermal head 1 and good printing quality can be provided at a high level.

Another Embodiment 4

Figure 11:
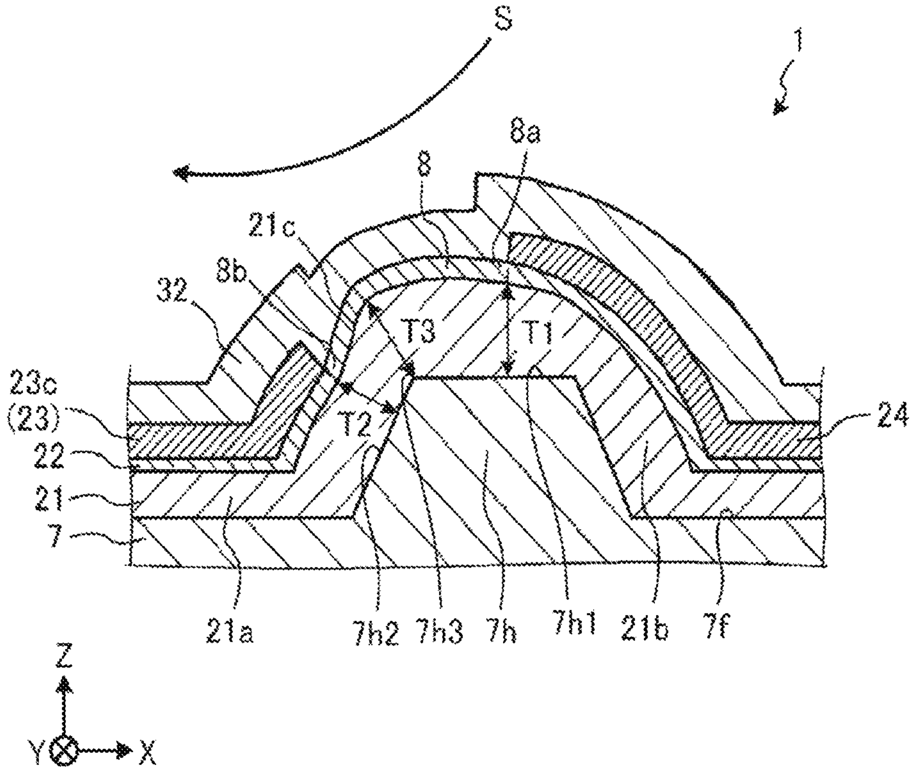
FIG. 11 is a cross-sectional view illustrating an example of the main portion of the thermal head according to another embodiment 4.

FIG. 11 is a cross-sectional view illustrating an example of the main portion of the thermal head 1 according to another embodiment 4. As illustrated in FIG. 11, in another embodiment 4, the configuration of the heat storage layer 21 differs from another embodiment 3 described above. Specifically, in the heat storage layer 21 of another embodiment 4, a thickness T3 of a portion located on a ridge 7*h*3 provided between the upper surface 7*h*1 and the side surface 7*h*2 of the protruding portion 7*h* is thicker than the thicknesses T1 and T2.

That is, in another embodiment 4, the thicknesses of the heat storage layer 21 satisfy T3>T1>T2.

This allows the protective layer 32 to have a convex shape between the first site 8*a* and the second site 8*b* of the heat generating part 8, allowing the recording medium P (see FIG. 12) to be easily brought into contact with the protective layer 32 located on the heat generating part 8 of the thermal head 1.

Thus, according to another embodiment 4, a tolerance of the head mounting angle in a thermal printer 100 (see FIG. 12) can be increased.

Thermal Printer

The thermal printer 100 according to the embodiment will be described with reference to FIG. 12. FIG. 12 is a view schematically illustrating a configuration of the thermal printer 100 according to the embodiment.

As illustrated in FIG. 12, the thermal printer 100 according to the embodiment includes the above-described thermal head 1, a transport mechanism 40, the platen roller 50, a power supply device 60, and a control device 70.

The thermal head 1 is mounted to a mounting surface 80*a* of a mounting member 80 provided in a housing (not illustrated) of the thermal printer 100. Note that the thermal head 1 is mounted to the mounting member 80 such that the thermal head 1 is aligned in the main scanning direction orthogonal to the transport direction S.

The transport mechanism 40 includes a drive unit (not illustrated) and transport rollers 43, 45, 47, and 49. The transport mechanism 40 transports the recording medium P, such as heat-sensitive paper or image-receiving paper to which ink is to be transferred, on the protective layer 32 disposed on the heat generating part 8 of the thermal head 1 so as to be along the transport direction S indicated by an arrow.

The drive unit has a function of driving the transport rollers 43, 45, 47, and 49, and a motor can be used for the drive unit, for example. The transport rollers 43, 45, 47, and 49 can be configured by, for example, covering cylindrical shaft bodies 43*a*, 45*a*, 47*a*, and 49*a* made of a metal such as stainless steel or the like, with elastic members 43*b*, 45*b*, 47*b*, and 49*b* made of butadiene rubber or the like.

Note that, when the recording medium P is, for example, an image-receiving paper or the like to which ink is to be transferred, an ink film (not illustrated) may be transported between the recording medium P and the heat generating part 8 of the thermal head 1 together with the recording medium P.

The platen roller 50 has a function of pressing the recording medium P on the protective layer 32 located on the heat generating part 8 of the thermal head 1. The platen roller 50 is disposed extending along the main scanning direction, and both end portions thereof are supported and fixed such that the platen roller 50 is rotatable according to transport of the recording medium P while pressing the recording medium P on the heat generating part 8.

The platen roller 50 can be configured by, for example, covering a cylindrical shaft body 50*a* made of a metal such as stainless steel or the like, with an elastic member 50*b* made of butadiene rubber or the like.

As described above, the power supply device 60 has a function of supplying a current for causing the heat generating parts 8 of the thermal head 1 to generate heat and a current for operating the drive IC 30. The control device 70 has a function of supplying a control signal for controlling an operation of the drive IC 30, to the drive IC 30 in order to selectively cause the heat generating parts 8 of the thermal head 1 to generate heat as described above.

The thermal printer 100 performs predetermined printing on the recording medium P by selectively causing the heat generating parts 8 to generate heat with the power supply device 60 and the control device 70, while the platen roller 50 presses the recording medium P on the heat generating parts 8 of the thermal head 1 and the transport mechanism 40 transports the recording medium P on the heat generating parts 8.

Note that, when the recording medium P is image-receiving paper or the like, printing on the recording medium P is performed by thermally transferring, to the recording medium P, an ink of the ink film (not illustrated) transported together with the recording medium P.

The thermal head 1 according to the embodiment includes the substrate 7, the heat storage layer 21 located on the substrate 7, and the heat generating parts 8 located on the heat storage layer 21. The transport direction S of the recording medium P is defined as the first direction, a direction opposite to the first direction is defined as the second direction, and in the heat storage layer 21, the thickness T1 of the portion located under the end portion (first site 8*a*) of the heat generating part 8 on the second direction side is thicker than the thickness T2 of the portion located under the end portion (second site 8*b*) of the heat generating part 8 on the first direction side. This can provide both high speed of the thermal head 1 and good printing quality.

In the thermal head 1 according to the embodiment, the heat storage layer 21 includes the first heat storage layer 21A and the second heat storage layer 21B. The first heat storage layer 21A is located between the end portion (first site 8*a*) of the heat generating part 8 on the second direction side and the substrate 7 and between the end portion (second site 8*b*) of the heat generating part 8 on the first direction side and the substrate 7. The second heat storage layer 21B has thermal conductivity lower than that of the first heat storage layer 21A, and is located between the end portion (first site

8*a*) of the heat generating part 8 on the second direction side and the substrate 7. This can achieve further high speed of the thermal head 1.

In the thermal head 1 according to the embodiment, the second heat storage layer 21B is located between the substrate 7 and the first heat storage layer 21A. This can simplify the manufacturing step of the thermal head 1.

In the thermal head 1 according to the embodiment, the second heat storage layer 21B is located between the first heat storage layer 21A and the heat generating parts 8. This can achieve further high speed of the thermal head 1.

In the thermal head 1 according to the embodiment, the heat storage layer 21 and the heat generating part 8 are located across a plurality of surfaces (the upper surface 7*h*1 and the side surface 7*h*2) of the substrate 7. The angle formed by the surface (upper surface 7*h*1) of the substrate 7 facing the end portion (first site 8*a*) of the heat generating part 8 on the second direction side and the printing surface of the recording medium P is smaller than the angle formed by the surface (side surface 7*h*2) of the substrate 7 facing the end portion (second site 8*b*) of the heat generating part 8 on the first direction side and the printing surface of the recording medium P. This can provide high speed of the thermal head 1 and good printing quality at a high level.

In the thermal head 1 according to an embodiment, in the heat storage layer 21, the thickness T3 of the portion located on the ridge 7*h*3 between the plurality of surfaces of the substrate 7 is thicker than the thickness T1 of the portion located under the end portion (first site 8*a*) of the heat generating part 8 on the second direction side and the thickness T2 of the portion located under the end portion (second site 8*b*) of the heat generating part 8 on the first direction side. This can increase the tolerance of the head mounting angle in the thermal printer 100.

In the thermal head 1 according to the embodiment, the heat storage layer 21 includes the stepped portion 21*c* between the portion located under the end portion (first site 8*a*) of the heat generating part 8 on the second direction side and the portion located under the end portion (second site 8*b*) of the heat generating part 8 on the first direction side. In the stepped portion 21*c*, the thickness of the heat storage layer 21 changes along the curved surface. This can reduce, when the recording medium P is pressed against the heat generating part 8 by a platen roller 50, a failure that the recording medium P tears by providing the site where the corner is raised in the protective layer 32.

The thermal printer 100 according to the embodiment includes the thermal head 1 described above, the transport mechanism 40 transporting the recording medium P onto the heat generating parts 8, and the platen roller 50 pressing the recording medium P on the heat generating part 8. This can achieve the thermal printer 100 that can provide both high speed of the thermal head 1 and good printing quality.

Although the embodiments of the present disclosure have been described above, the present disclosure is not limited to the embodiments described above, and various changes can be made without departing from the spirit of the present disclosure. For example, in the embodiments described above, the case is described in which the heat generating part 8 is located on the first surface 7*f* of the substrate 7, but the present disclosure is not limited to such an example.

For example, in the present disclosure, the heat generating part 8 may be located on the side surface of the substrate 7 on the first long side 7*a* side, or the heat generating part 8 may be formed on an inclined surface separately formed from the upper surface to the side surface along the first long side 7*a* of the substrate 7.

In the above-described embodiment, the case is described in which the protruding portion 7*h* has the trapezoidal shape in a cross-sectional view, but the present disclosure is not limited to such an example, and the protruding portion 7*h* may have, for example, a polygonal shape in a cross-sectional view.

Additional effects and other aspects can be easily derived by a person skilled in the art. Thus, a wide variety of aspects of the present disclosure are not limited to the specific details and representative embodiments represented and described above. Accordingly, various changes are possible without departing from the spirit or scope of the general inventive concepts defined by the appended claims and their equivalents.

The invention claimed is:

1. A thermal head, comprising:
a substrate;
a heat storage layer located on the substrate; and
a heat generating part located on the heat storage layer,
wherein a transport direction of a recording medium is defined as a first direction,
a direction opposite to the first direction is defined as a second direction, and
in the heat storage layer, a first thickness of a first portion located under an end portion of the heat generating part on a side of the second direction is thicker than a second thickness of a second portion located under an end portion of the heat generating part on a side of the first direction,
on a surface of the substrate that is in contact with the heat storage layer, a region extending from under the first portion to under the second portion is a single plane, and
the heat storage layer has, between the first portion and the second portion, a portion that is thicker than the first thickness.

2. The thermal head according to claim 1,
wherein the heat storage layer comprises
a first heat storage layer located between the end portion of the heat generating part on the side of the second direction and the substrate and between the end portion of the heat generating part on the side of the first direction and the substrate and
a second heat storage layer having thermal conductivity lower than thermal conductivity of the first heat storage layer and located between the end portion of the heat generating part on the side of the second direction and the substrate.

3. The thermal head according to claim 2, wherein the second heat storage layer is located between the substrate and the first heat storage layer.

4. The thermal head according to claim 2, wherein the second heat storage layer is located between the first heat storage layer and the heat generating part.

5. A thermal printer, comprising:
the thermal head according to claim 2;
a transport mechanism configured to transport the recording medium on the heat generating part; and
a platen roller configured to press the recording medium on the heat generating part.

6. The thermal head according to claim 1,
wherein the heat storage layer comprises a stepped portion between the portion located under the end portion of the heat generating part on the side of the second direction and the portion located under the end portion of the heat generating part on the side of the first direction, and in the stepped portion, a thickness of the heat storage layer changes along a curved surface.

7. A thermal printer, comprising:

the thermal head according to claim 6;

a transport mechanism configured to transport the recording medium on the heat generating part; and a platen roller configured to press the recording medium on the heat generating part.

8. A thermal printer, comprising:

the thermal head according to claim 1;

a transport mechanism configured to transport the recording medium on the heat generating part; and a platen roller configured to press the recording medium on the heat generating part.

9. The thermal head according to claim 1, further comprising:

a resistance layer located on the heat storage layer;

a first electrode located on the resistance layer on the side of the first direction; and a second electrode located on the resistance layer on the side of the second direction, wherein the heat generating part is the resistance layer between the first electrode and the second electrode.

10. The thermal head according to claim 9, wherein the end portion of the heat generating part on the side of the first direction is a first cross-section of the heat storage layer perpendicular to the first direction and the second direction that intersects a tip portion of the first electrode, and the end portion of the heat generating part on the side of the second direction is a second cross-section of the heat storage layer perpendicular to the first direction and the second direction that intersects a tip portion of the second electrode.

11. The thermal head according to claim 10, wherein the first thickness is a distance along the first cross-section of the heat storage layer from the substrate to the heat generating part, and the second thickness is a distance along the second cross-section of the heat storage layer from the substrate to the heat generating part.

12. A thermal head, comprising:

a substrate;

a heat storage layer located on the substrate; and a heat generating part located on the heat storage layer, wherein a transport direction of a recording medium is defined as a first direction, a direction opposite to the first direction is defined as a second direction, and wherein the heat storage layer and the heat generating part are located across a plurality of surfaces of the substrate, and an angle formed by a surface of the substrate facing the end portion of the heat generating part on the side of the second direction and a printing surface of the recording medium is smaller than an angle formed by a surface of the substrate facing the end portion of the heat generating part on the side of the first direction and the printing surface of the recording medium.

13. The thermal head according to claim 12, wherein in the heat storage layer, a thickness of a portion located on a ridge between the plurality of surfaces of the substrate is thicker than the thickness of the portion located under the end portion of the heat generating part on the side of the second direction and the thickness of the portion located under the end portion of the heat generating part on the side of the first direction.

14. The thermal head according to claim 12, wherein in the heat storage layer, a first thickness of a first portion located under an end portion of the heat generating part on a side of the second direction is thicker than a second thickness of a second portion located under an end portion of the heat generating part on a side of the first direction.

15. A thermal printer, comprising:

the thermal head according to claim 5;

a transport mechanism configured to transport the recording medium on the heat generating part; and a platen roller configured to press the recording medium on the heat generating part.

* * * * *